US011203434B2

(12) United States Patent
D'Alessio et al.

(10) Patent No.: US 11,203,434 B2
(45) Date of Patent: Dec. 21, 2021

(54) DIAPHRAGM ATTACHMENT METHOD FOR AIRCRAFT SEATING (71) Applicant: B/E Aerospace, Inc., Winston-Salem, NC (US)

(72) Inventors: Bradford D'Alessio, Winston-Salem, NC (US); Ryan J. Suhre, Winston-Salem, NC (US); Stephen A. Puglisi, Greensboro, NC (US)

(73) Assignee: B/E Aersospace, Inc., Winston-Salem, NC (US)

( * ) Notice: Subject to any disclaimer, the term of this patent is extended or adjusted under 35 U.S.C. 154(b) by 144 days.

(21) Appl. No.: 16/665,534

(22) Filed: Oct. 28, 2019

(65) Prior Publication Data
US 2021/0122474 A1 Apr. 29, 2021

(51) Int. Cl.
*B64D 11/06* (2006.01)

(52) U.S. Cl.
CPC ............... *B64D 11/0647* (2014.12)

(58) Field of Classification Search
CPC ... B64D 11/06; B64D 11/0647; B60N 2/7011; A47C 31/02; A47C 31/023; A47C 5/06
See application file for complete search history.

(56) References Cited

U.S. PATENT DOCUMENTS

| | | | | |
|---|---|---|---|---|
| 4,848,843 A * | 7/1989 | Gibbs | ............... | A47C 3/00 297/440.22 |
| 5,553,923 A | 9/1996 | Bilezikjian | | |
| 5,762,403 A | 6/1998 | Robinson | | |
| 5,787,562 A | 8/1998 | Penley | | |
| 6,254,190 B1 * | 7/2001 | Gregory | ............... | A47C 5/06 297/440.11 |
| 6,604,792 B1 | 8/2003 | Picard | | |
| 6,739,671 B2 * | 5/2004 | De Maina | ............ | B60N 2/7011 297/440.1 |
| 9,580,175 B2 | 2/2017 | Velasco et al. | | |
| 10,766,622 B2 * | 9/2020 | Abelheira | ............... | B60N 2/753 |
| 2003/0094838 A1 * | 5/2003 | Williamson | ....... | B64D 11/0648 297/232 |
| 2011/0101165 A1 * | 5/2011 | Fullerton | ........... | B64D 11/0649 244/122 R |
| 2014/0300171 A1 * | 10/2014 | Velasco | ............. | B64D 11/0647 297/452.18 |
| 2017/0267143 A1 * | 9/2017 | Bowker | ............... | B64D 11/064 |
| 2017/0320579 A1 | 11/2017 | Velasco | | |

FOREIGN PATENT DOCUMENTS

| | | |
|---|---|---|
| EP | 2991898 B1 | 7/2020 |
| GB | 1495585 A | 12/1977 |
| GB | 2516481 A | 1/2015 |

OTHER PUBLICATIONS

Search Report for European Application No. 20204408.7 dated Mar. 11, 2021, 7 pages.

* cited by examiner

*Primary Examiner* — Richard G Davis
(74) *Attorney, Agent, or Firm* — Suiter Swantz pc llo (57) ABSTRACT

An aircraft seating system includes spreaders having restricted channels to receive a portion of diaphragm wrapped around a cord to hold the diaphragm in place at each side. The diaphragm includes a second or core layer of fabric within the diaphragm to increase the strength of the diaphragm, provide ventilation, and/or provide cushioning. The spreaders may include restricted channels to receive a diaphragm and cord for a seat back portion. The seat back portion and seat bottom portion may be a single piece or separate pieces.

13 Claims, 7 Drawing Sheets

DIAPHRAGM ATTACHMENT METHOD FOR AIRCRAFT SEATING

BACKGROUND

Traditional attachment methods of soft diaphragms on aircraft seats incorporate the use of a spreader bar or sewn on clips in order to secure the diaphragm to the surrounding structure. The use of clips may be needed in order to package around surrounding structure, however in doing so the diaphragm is not uniformly loaded or stretched, leading to premature wear and degradation.

SUMMARY

In one aspect, embodiments of the inventive concepts disclosed herein are directed to an aircraft seating system with spreaders having restricted channels to receive a portion of diaphragm wrapped around a cord to hold the diaphragm in place at each side.

In a further aspect, the diaphragm includes a second or core layer of fabric within the diaphragm. The second layer may increase the strength of the diaphragm, provide ventilation, and/or provide cushioning.

In a further aspect, the spreaders include restricted channels to receive a diaphragm and cord for a seat back portion. The seat back portion and seat bottom portion may be a single piece or separate pieces.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft seating system with spreaders having restricted channels to receive a portion of diaphragm wrapped around a cord to hold the diaphragm in place at each side.

Figure 1:
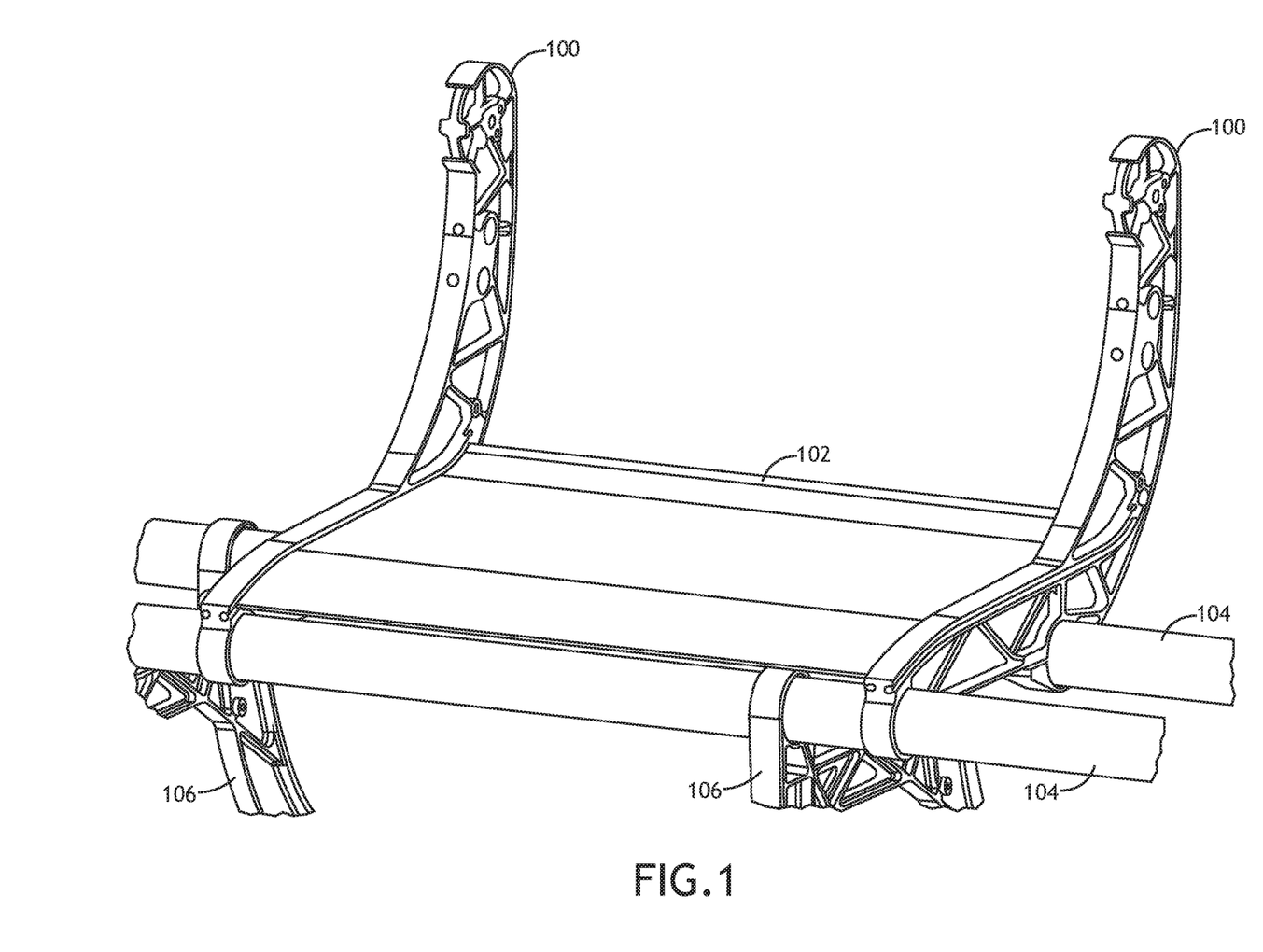
FIG. 1 shows a perspective view of an exemplary embodiment of an aircraft seat.

Referring to FIG. 1, a perspective view of an exemplary embodiment of an aircraft seat is shown. The aircraft seat includes two spreaders 100 and a diaphragm 102 connected to each of the two spreaders 100 in restricted channels defined by the spreaders 100. Each spreader may include at least two rail collars to engage at least two support rails 104 that are further supported by a set of main supports 106 connecting the support rails 104 to the floor of the aircraft.

Embodiments of the inventive concepts disclosed herein may allow for aircraft seats with fewer components inside the spreaders 100, resulting in a generally narrower spreader 100 that allows more width for passengers.

Figure 2:
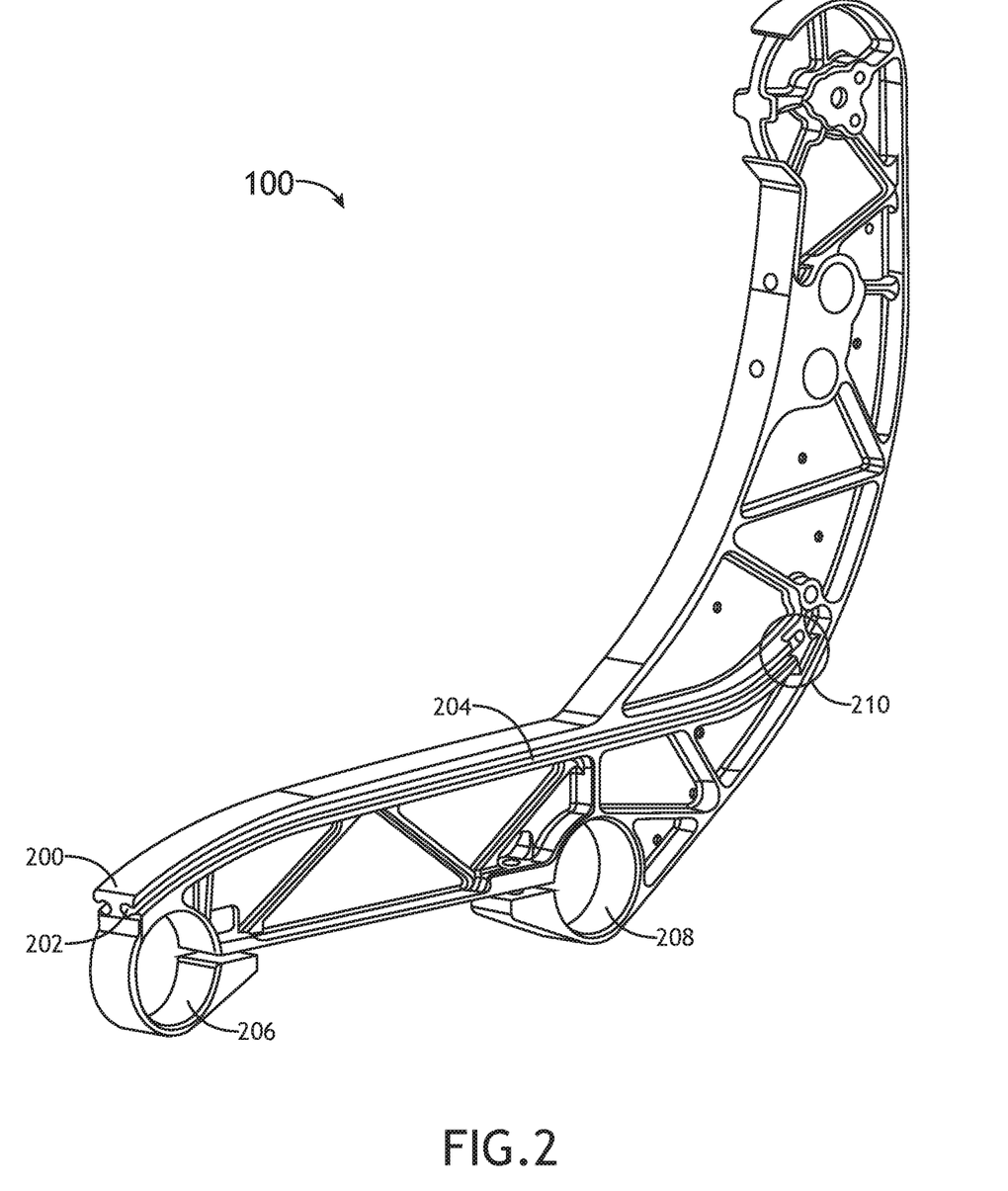
FIG. 2 shows a perspective view of an exemplary embodiment of an aircraft seat spreader.

Referring to FIG. 2, a perspective view of an exemplary embodiment of an aircraft seat spreader 100 is shown. The spreader 100 has a diaphragm retaining portion 200 that defines one or more restrictive channels 204 with restrictive channel openings 202 in a front surface. The restrictive channels 204 define a center line portion configured to receive a semi-rigid filler or cord element with diaphragm material wrapped around, and a lateral opening configured to allow overlapping layers of diaphragm material to pass through, but not the cord element.

In at least one embodiment, the spreader 100 defines a plurality of rail collars 206, 208, each configured to engage a support rail. The rail collars 206, 208 may be tightened to clamp down onto the corresponding support rails and hold the spreader 100 stationary.

In at least one embodiment, a distal portion 210 of the restrictive channel 204 defines a maximum insertion feature, but is open to allow the cord element to be pulled through. Pulling the cord element through the restrictive channel 204 may facilitate inserting the diaphragm by allowing the user to grip the cord element firmly and pull the diaphragm through.

Figure 3:
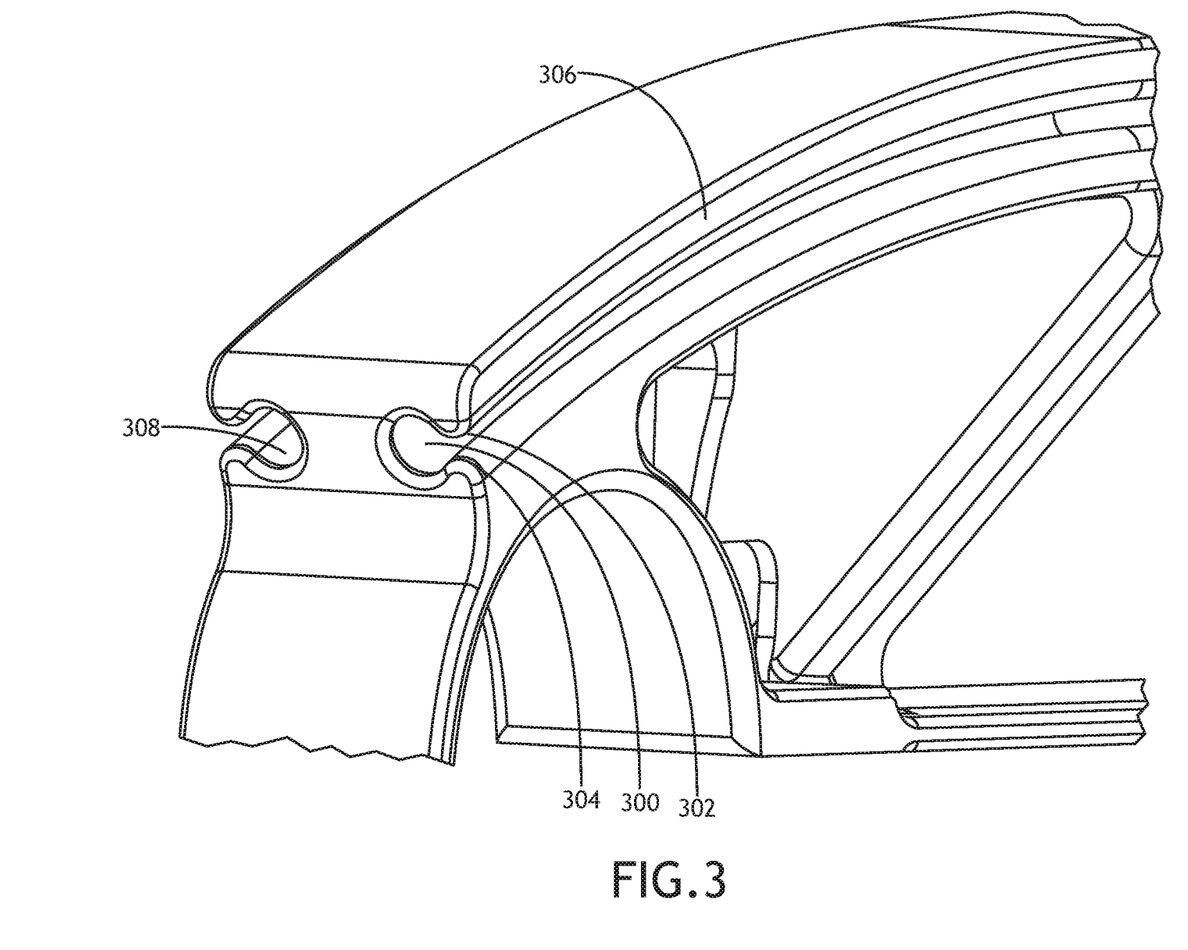
FIG. 3 shows a perspective, detail view of an exemplary embodiment of an aircraft seat spreader.

Referring to FIG. 3, a perspective, detail view of an exemplary embodiment of an aircraft seat spreader is shown. The restrictive channel 306 and restrictive channel opening 300 are defined by an upper restrictive surface 302 and a lower restrictive surface 304 to establish a "throat" or "pinch point." The upper restrictive surface 302 and lower restrictive surface 304 also distribute the load of a person sitting on the corresponding diaphragm, and to distribute wear on the diaphragm evenly with respect to an upper diaphragm surface and a lower diaphragm surface.

Furthermore, the spreader may define a first restrictive channel 306 and a second restrictive channel 308 on opposite sides of the spreader. Aircraft seating is often in rows; having aligned, opposing restrictive channels may reduce torsional stresses on the supporting rails and the spreader by offsetting loads between neighboring seats.

Figure 4A:
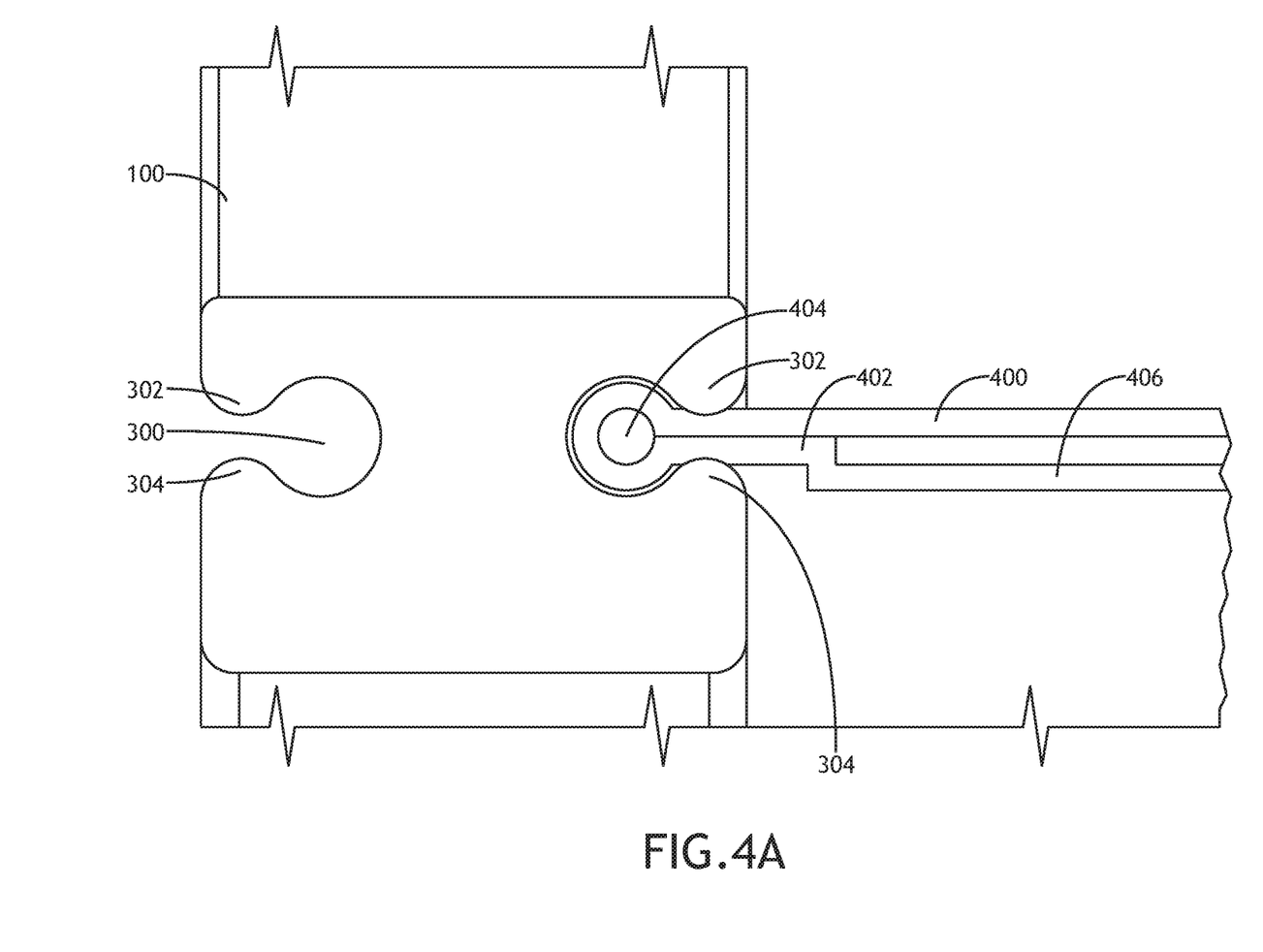
FIG. 4A shows a front, detail view of an exemplary embodiment of an aircraft seat.
Figure 4B:
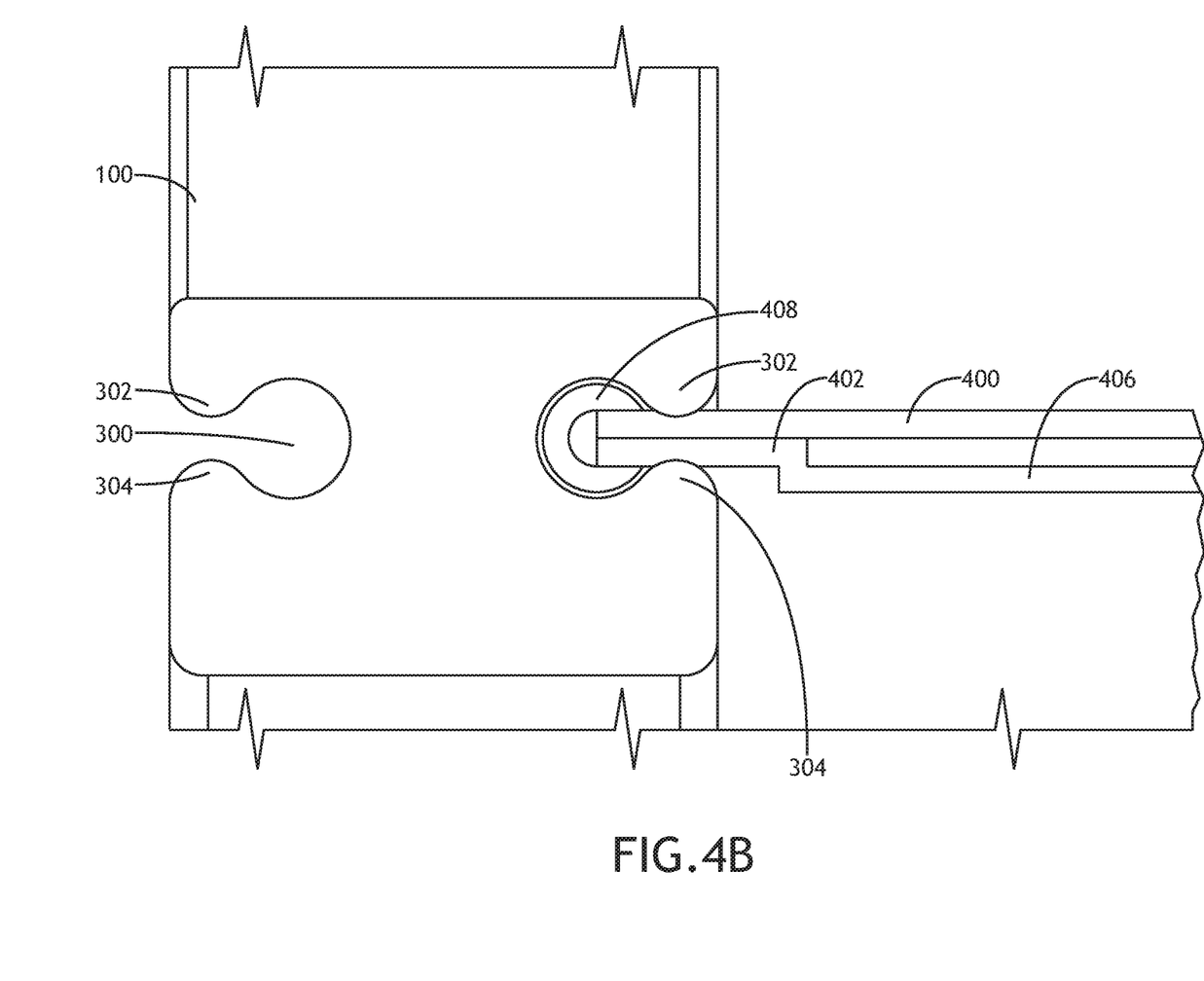
FIG. 4B shows a front, detail view of an exemplary embodiment of an aircraft seat.

Referring to FIGS. 4A-4B, front, detail views of exemplary embodiments of an aircraft seat are shown. The aircraft seat comprises a plurality of spreaders 100 having restrictive channels 300, each defined by an upper restrictive surface 302 and a lower restrictive surface 304 to distribute the load of a person sitting on the corresponding diaphragm 400, 402, and to distribute wear on the diaphragm 400, 402 evenly with respect to an upper diaphragm surface 400 and a lower diaphragm surface 402.

In at least one embodiment, the diaphragm 400, 402 is secured in one of the restrictive channels 300 via a cord element 404. The combined cord element 404 and diaphragm 400, 402 wrapped around the cord element 404 fits within the restrictive channel 300 but cannot pass through the space defined by the upper restrictive surface 302 and lower restrictive surface 304; however the combined upper diaphragm surface 400 and lower diaphragm surface 402 can fit through the space defined by the upper restrictive surface 302 and lower restrictive surface 304.

In at least one embodiment, the cord element 404 may be integrated into the diaphragm 400, 402 at a point where the upper diaphragm surface 400 and the lower diaphragm surface 402 fold over (for example, sewn into the structure of the diaphragm 400, 402). Alternatively (as in FIG. 4B), the cord element 408 may be a semi-rigid, cylindrical clamp to secure the upper diaphragm surface 400 and the lower diaphragm surface 402 together at an edge.

In at least one embodiment, the cord element 404 comprises periodic extrusions configured to engage the fabric of the diaphragm 400, 402 such that pulling an extended portion of the cord element 404 through the restrictive channel 300 allows an installer to also pull the combined cord element 404 and diaphragm 400, 402 through.

In at least one embodiment, the diaphragm 400, 402 includes an internal layer 406. The internal layer 406 may comprise a layer of material similar to the upper diaphragm surface 400 and lower diaphragm surface 402. Alternatively, the internal layer 406 may comprise a cushion. Alternatively, the internal layer 406 may comprise a ventilation element to circulate air and cool the seat.

Figure 5:
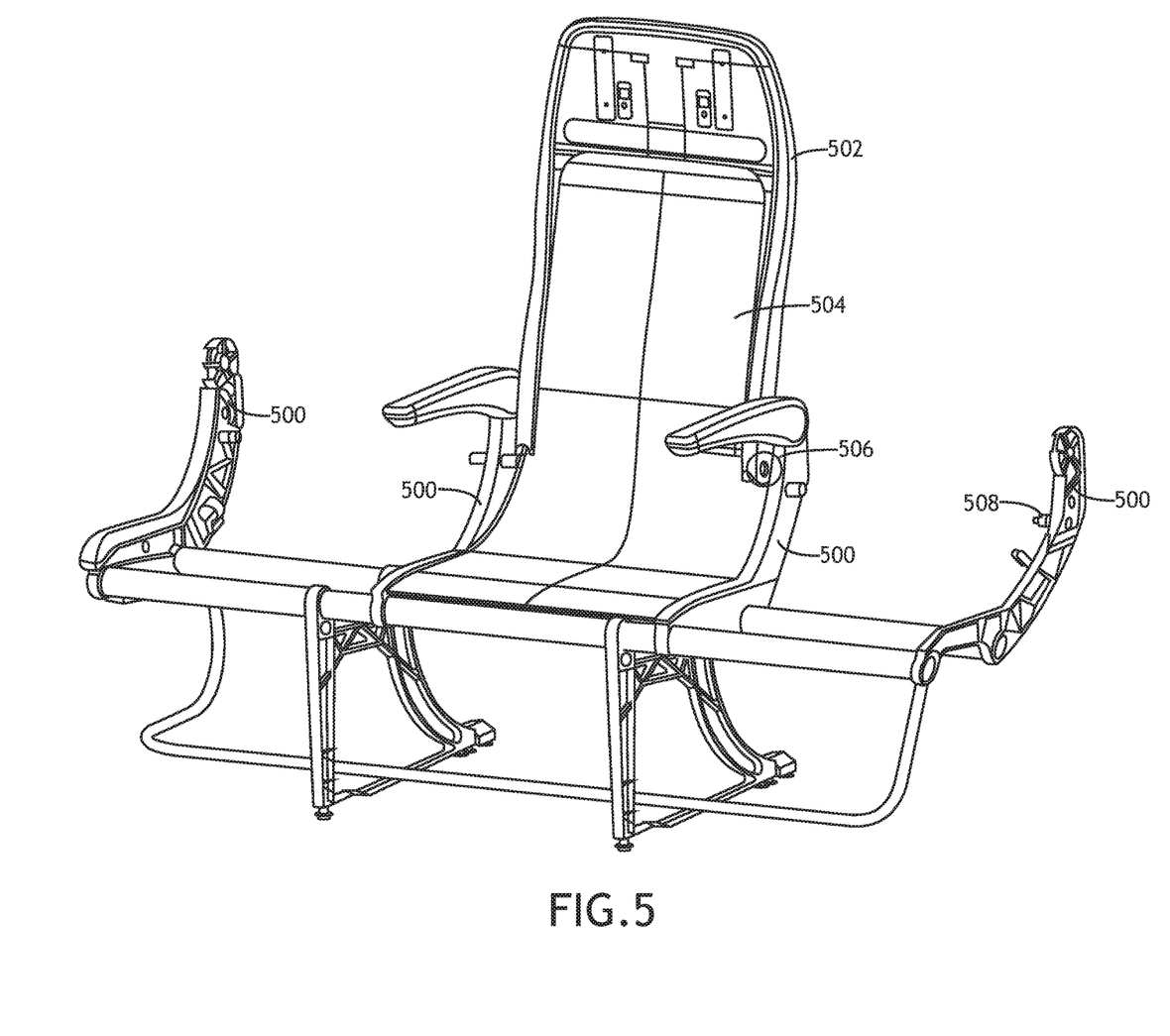
FIG. 5 shows a perspective view of an exemplary embodiment of an aircraft seat.

Referring to FIG. 5, a perspective view of an exemplary embodiment of an aircraft seat is shown. The aircraft seat includes at least two spreaders 500 and a seat back frame 502. In at least one embodiment, a diaphragm 504 is held securely within restrictive channels of two of the spreaders 500 to form a seat portion; the diaphragm 504 further extends out of a rear opening of the restrictive channels to be held within the seat back frame 502 to form a continuous seat surface. The seat back frame 502 may also define restrictive channels to secure the diaphragm 504 and form a seat back portion of the continuous surface.

A continuous seat surface allows for more space inside of the structure of the seat back, which may be useful more optional seat back equipment (literature pockets, monitors, accessories), or more usable/living space for the passenger behind. A diaphragm 504 having variable width allows for variable tension in different regions of the continuous surface; for example, the seat portion could be narrower and tighter to help suspend the passenger off of other structures (such as support rails) while the back portion could be wider and looser to increase comfort level.

In at least one embodiment, the seat back frame 502 defines spreader connection elements 506 configured to engage corresponding seat back frame engaging elements 508 disposed on the corresponding spreader 500. In at least one embodiment, the seat back frame 502 is configured to pivot about the seat back frame engaging elements 508.

Figure 6:
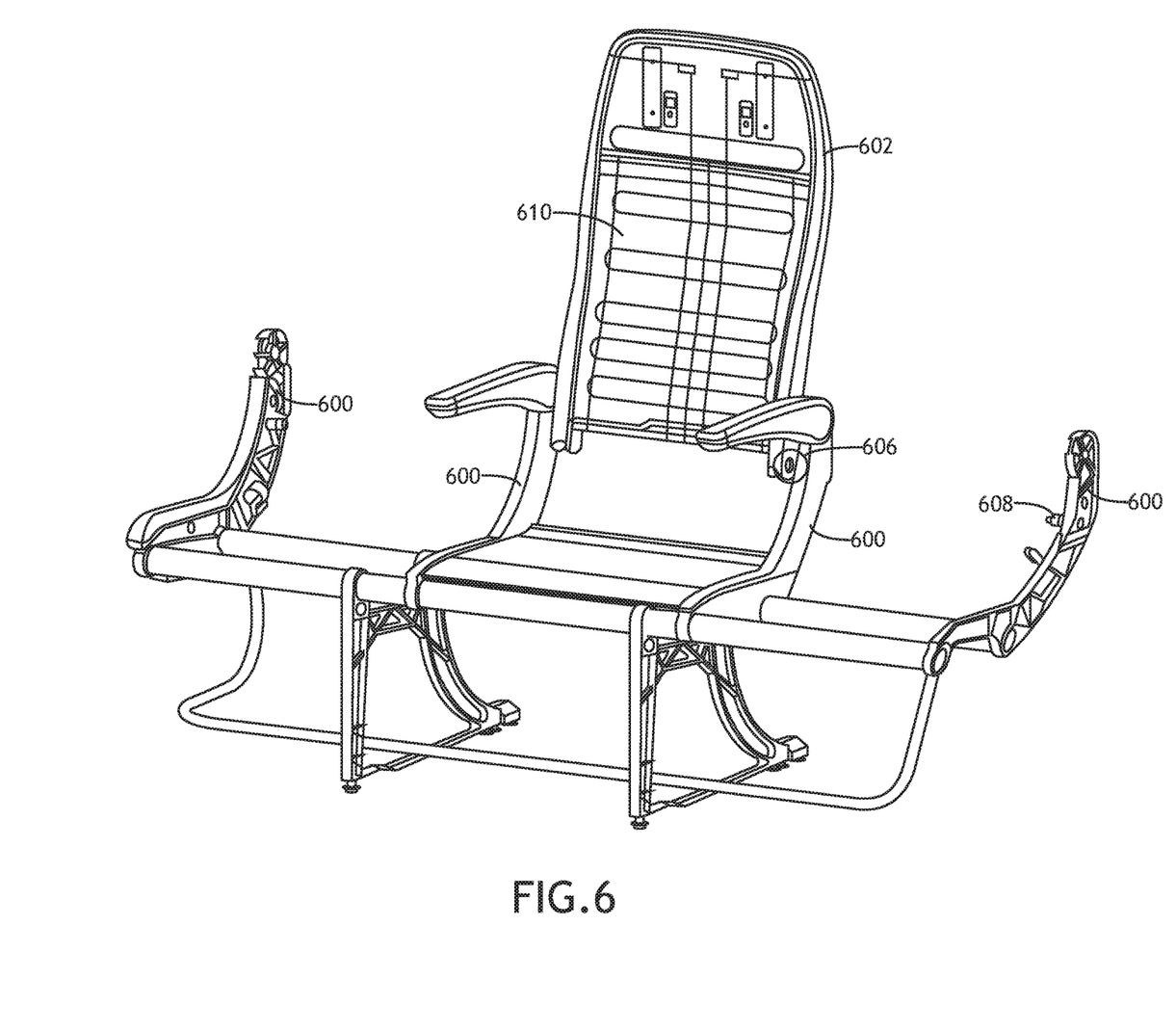
FIG. 6 shows a perspective view of an exemplary embodiment of an aircraft seat.

Referring to FIG. 6, a perspective view of an exemplary embodiment of an aircraft seat is shown. The aircraft seat includes at least two spreaders 600 and a seat back frame 602. In at least one embodiment, a diaphragm 604 is held securely within restrictive channels of two of the spreaders 600 to form a seat portion. The seat back frame 602 separately defines a seat back portion 610 such as via a separate set of restrictive channels to secure a separate diaphragm; such separate diaphragm may include all of the features described herein. Alternatively, the seat back portion 610 may be a rigid structure.

In at least one embodiment, the seat back frame 602 defines spreader connection elements 606 configured to engage corresponding seat back frame engaging elements 608 disposed on the corresponding spreader 600. In at least one embodiment, the seat back frame 602 is configured to pivot about the seat back frame engaging elements 608.

This new attachment method allows for direct connection of the diaphragm to the structure without the need of an intermediary component and for uniform loading across the diaphragm. When replacing a spreader bar system this allows for a lower total part count, cost, and opportunities/locations for failure.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages;

and individual features from various embodiments may be combined to arrive at other embodiments. The form hereinbefore described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A seating system comprising:
    at least two spreaders, each spreader defining at least one restrictive channel, and each spreader comprising at least one seat back frame engaging element;
    a seat back frame defining at least two restrictive channels and two or more spreader connection elements configured to engage a corresponding seat back frame engaging element;
    a diaphragm; and
    at least two cord elements, each cord element comprising a semi-rigid cylindrical clamp configured to retain an edge of the diaphragm in a corresponding restrictive channel.

2. The seating system of claim 1, wherein each spreader further comprises at least two rail collars disposed on a bottom surface, each rail collar configured to engage a rail support to prevent lateral movement of the corresponding spreader.

3. The seating system of claim 1; wherein the diaphragm comprises an internal cushioning layer.

4. The seating system of claim 1; wherein the diaphragm comprises an internal ventilation layer.

5. The seating system of claim 1; wherein each of the at least two cord elements further comprises a plurality of extrusions configured to engage the diaphragm and apply a force to the diaphragm along a path defined by the restrictive channel during installation.

6. The seating system of claim 1; wherein each spreader defines two restrictive channels, each restrictive channel disposed on opposing sides of the corresponding spreader.

7. An aircraft comprising:
    a seating system comprising:
        at least two spreaders, each spreader defining at least one restrictive channel, and each spreader comprising at least one seat back frame engaging element;
        a seat back frame defining two or more spreader connection elements configured to engage a corresponding seat back frame engaging element;
        a diaphragm; and
        at least two cord elements, each cord element comprising a semi-rigid cylindrical clamp configured to retain an edge of the diaphragm in a corresponding restrictive channel.

8. The aircraft of claim 7, wherein each spreader further comprises at least two rail collars disposed on a bottom surface, each rail collar configured to engage a rail support to prevent lateral movement of the corresponding spreader.

9. The aircraft of claim 7; wherein the diaphragm comprises an internal cushioning layer.

10. The aircraft of claim 7; wherein the diaphragm comprises an internal ventilation layer.

11. The aircraft of claim 7; wherein each of the at least two cord elements further comprises a plurality of extrusions configured to engage the diaphragm and apply a force to diaphragm along a path defined by the restrictive channel during installation.

12. The aircraft of claim 7; wherein each spreader defines two restrictive channels, each restrictive channel disposed on opposing sides of the corresponding spreader.

13. The aircraft of claim 7; wherein the diaphragm comprises a seat portion.

* * * * *